J. F. ROLLAND & P. A. P. MAUCLERE.
APPARATUS FOR STORING AND DISTRIBUTING INFLAMMABLE LIQUIDS.
APPLICATION FILED NOV. 18, 1912.
1,097,470.
Patented May 19, 1914.
2 SHEETS—SHEET 1.
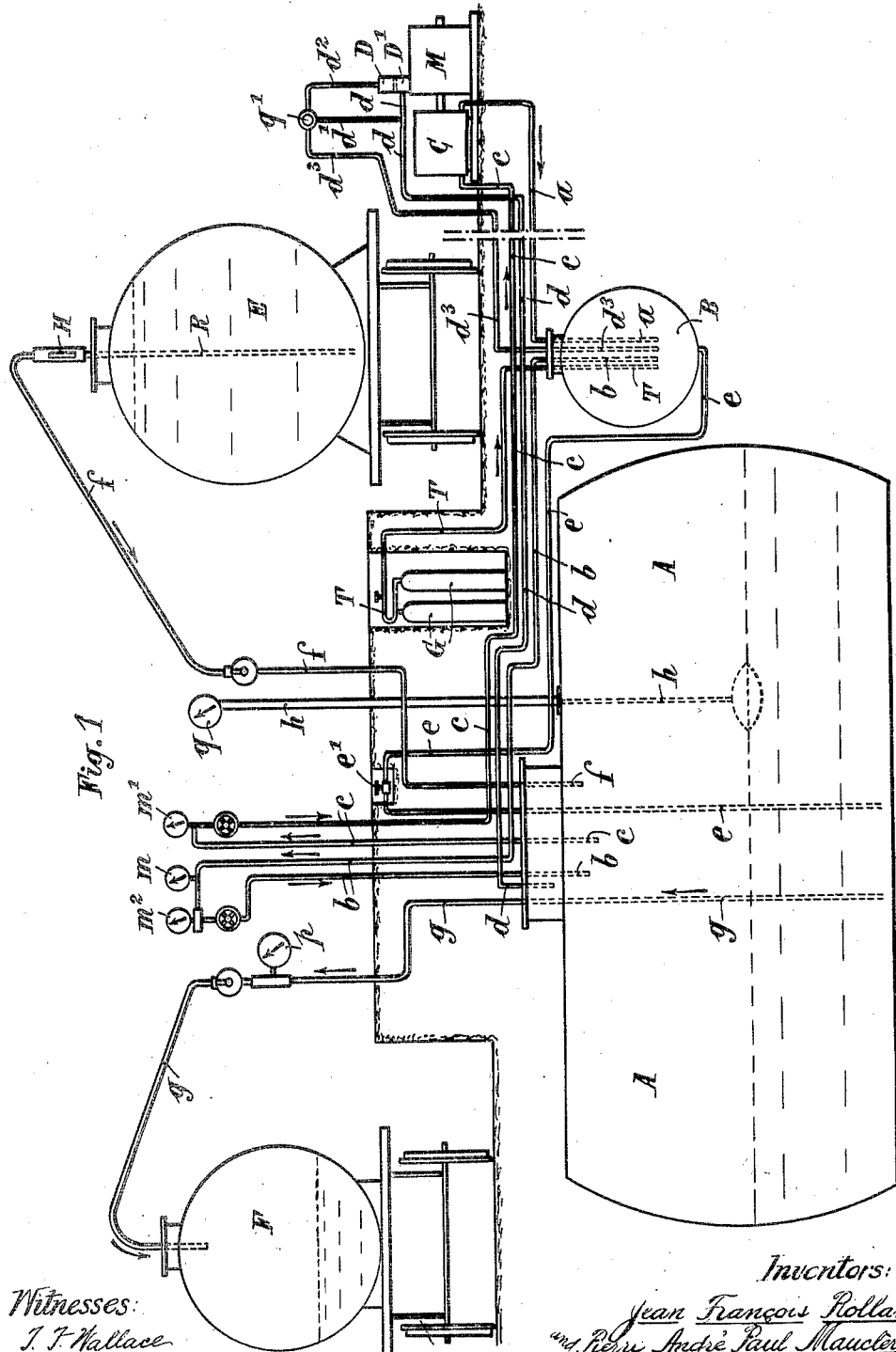

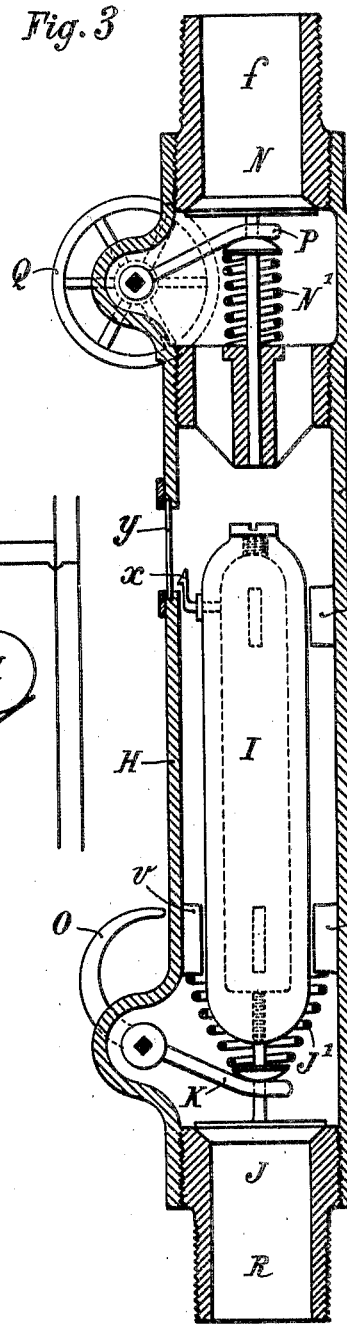
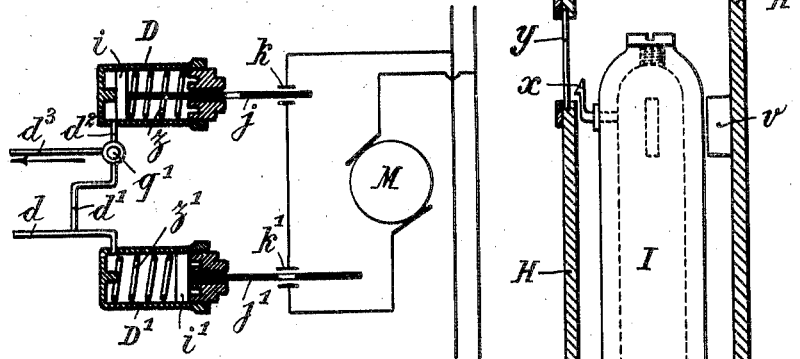

UNITED STATES PATENT OFFICE.

JEAN FRANÇOIS ROLLAND AND PIERRE ANDRÉ PAUL MAUCLÈRE, OF PARIS, FRANCE.

APPARATUS FOR STORING AND DISTRIBUTING INFLAMMABLE LIQUIDS.

1,097,470.    Specification of Letters Patent.    Patented May 19, 1914.

Application filed November 18, 1912. Serial No. 732,180.

*To all whom it may concern:*

Be it known that we, JEAN FRANÇOIS ROLLAND and PIERRE ANDRÉ PAUL MAUCLÈRE, citizens of the Republic of France, residing in Paris, France, have invented certain new and useful Improvements in Apparatus for Storing and Distributing Inflammable Liquids, of which the following is a specification.

This invention consists of a method and apparatus for effecting the storing, manipulation and distribution of hydrocarbon and other liquids out of contact with the air.

The invention, which is particularly suitable for dealing with hydrocarbon liquids, allows of attaining a high degree of safety in the keeping and manipulation of these inflammable liquids.

According to this invention, the liquid is stored in a reservoir, preferably underground, where it is in contact with an inert and neutral gas, such as nitrogen or carbonic acid gas, the introduction of the liquid into said reservoir and its withdrawal therefrom being effected out of contact with the air under a layer of inert gas which is retained in the installation.

A characteristic point of the invention is that the pressure in the liquid reservoir remains always equal to the atmospheric pressure. The result is that there can be no entrance of air, as could occur if the pressure in the reservoir were able at any time to become less than that of the atmosphere; nor accidental escape or discharge of the liquid stored in the reservoir, as could happen if the pressure in the apparatus during rest could become greater than that of the atmosphere. The atmospheric pressure is thus maintained in the liquid reservoir when neither filling nor drawing off is taking place, a slight suction or vacuum being created in the reservoir during filling, while on the other hand a slightly increased pressure is exerted on the surface of the liquid in the reservoir for withdrawing liquid therefrom.

The following description will allow of readily understanding the combination of means which thus permits of maintaining absolutely and permanently the atmospheric pressure on the liquid when filling or withdrawing of liquid is not taking place. Two switches serve for automatically starting and stopping when necessary, a motor which actuates a gas compressor, and this by the simple operation of valves provided on the liquid reservoir or reservoirs. Moreover, there is provided on the filling pipe of the reservoir or reservoirs an apparatus which prevents any appreciable entrance of air at the end of an emptying operation.

Figure 1 of the drawings is a diagram of an installation embodying the invention. Fig. 2 shows a detail of the switching apparatus. Fig. 3 is a detail sectional view of an apparatus for preventing entrance of air into the main reservoir or reservoirs when an external supply reservoir such as a tank car is emptied completely.

The installation illustrated comprises a main storage reservoir A for liquid preferably placed underground, a reservoir B of much smaller size for receiving compressed inert gas, and a pump C for transferring inert gas from the main storage reservoir A to the gas reservoir B. The pump may be operated in various ways, by hand or mechanically, but preferably by means of an electric motor indicated at M. A system of pipes or connections is provided between the two reservoirs A and B and the pump as follows: A pipe $a$ leads from the pump C into the vessel B; from the vessel B another pipe $b$ (in which are fitted a pressure gage $m$ and a pressure reducing or expansion device $m^2$,) extends into the reservoir A. A pipe $c$, (in which is likewise fitted a pressure gage $m'$) leads from reservoir A to the pump C and forms the suction pipe of the pump. A pipe $d$ leads from the reservoir A and a pipe $d^3$ leads from the gas reservoir B to a switching device D D' in the form of a cut-in and cut-out device, the function of which is to start automatically the electric motor which operates the pump C.

$c$ is a pipe which connects the lower part of the gas reservoir B with the interior of the reservoir A, extending almost to the bottom of the latter reservoir. A pipe $f$ serves for filling the reservoir A, and a pipe $g$ serves for filling the apparatus or external vessels intended for transporting, vending, or using the liquid. Finally a float gage or level indicator $h$ serves to show the height of the liquid contained in the reservoir A.

The manner of storing liquid in the reservoir and of withdrawing same therefrom is as follows: An inert gas is introduced into the main reservoir under such a pressure that if liquid were in the reservoir it would be forced up to a sufficient height to issue from the delivery orifice, as, for instance, the end of pipe *g*. The gas in the reservoir A is brought to atmospheric pressure. This operation takes place automatically, the electric motor M starting and continuing to run as long as the pressure in the reservoir A is greater than that of the atmosphere. This result is obtained by means of the cut-in and cut-out apparatus shown separately in detail in Fig. 2 and which will now be described.

One of the cut-in and cut-out devices comprises a cylinder D containing a piston *i* having an insulated rod *j* connected thereto and having a metallic portion *j*³ thereon adapted to close and open the motor circuit at *k* (Fig. 2). A very weak coiled spring *z* is fitted between the piston *i* and the inner end of the cylinder D. The other cylinder D' likewise contains a piston *i'*, having an insulated rod *j'* connected thereto. A metallic portion *j*⁴ opens and closes the motor circuit at *k'*. A spring *z'* is fitted between the piston *i'* and the outer end of the cylinder.

The springs *z* and *z'* operate on opposite sides of their respective pistons, so that one spring presses its piston in one direction and the other spring presses its piston in an opposite direction. While the tension of the spring *z* is very slight, that of the spring *z'* is sufficiently strong for the piston *i'* to be pushed forward thereby and the pressure of the gas in the reservoir A when the pressure is less than 1 kg. and more than about 0.8 kg. By screwing the ends of the cylinders D, D' farther in or out, the tension of the springs can be adjusted to secure the operation of the cut-in and cut-out devices in the manner described.

It was above explained that the pressure in the reservoir A was greater than that of the atmosphere and that it was necessary to allow the same to fall to atmospheric pressure. This takes place automatically as soon as the electric circuit is closed. The pressure in the reservoir A, when greater than that of the atmosphere, acts through the piping *d*, *d*¹ and *d*² upon the piston *i* of cylinder D, forces the piston forward, and closes the motor circuit at *k*. The electric motor starts, and the pump C draws the gas from the reservoir A and forces it into the small reservoir B. As soon as the pressure in the storage reservoir A has fallen so far that it is only very little greater than atmospheric pressure, the piston *i* of the cut-in and cut-out cylinder D moves back under the action of its weak spring *z* and the electric circuit is broken at *k*; the motor and the pump at once stop, leaving in the reservoir A a pressure equal to that of the atmosphere. It is in this condition that the reservoir A is when it is empty, or when it contains a certain quantity of liquid, and there is no manipulation to be effected. If one of the pipes opening into the main reservoir A is cut off inadvertently, or for any other reason, no liquid can issue from the reservoir and no air can enter from the outside, the more so as all the pipes are provided with tight closing devices. Outside of the hours of manipulation, current is always on whereby the motor may be energized by means of the cut-in or cut-out devices D, D' so that if for any cause an increase of pressure should occur in the reservoir A, the motor M will immediately come into action and the pump will draw gas and thus remove the momentary excess of pressure. The reservoir A being assumed as in the condition above described, the method of delivering liquid into the reservoir for storing, and also the method of drawing liquid therefrom will now be described.

In order to store the liquid, delivered for example from a tank car E, gas under pressure is admitted from the accumulator B through pipes *d*³, *d*² to the rear of the piston *i* of the cut-in and cut-out device D, by means of the three-way cock *q'*. The piston *i* of the cut-in and cut-out device D moves forward under the pressure of the gas in the reservoir B; the motor circuit is closed at *k* and the electric motor starts running; the pump is operated and produces a partial vacuum in the reservoir A, the effect of which is to rapidly prime and start the siphon formed by the pipe *f* and a rigid pipe or leg R. The tank car is thus emptied by siphon action, the pump C continuing to draw the gas from the storage reservoir to make room for the liquid and compressing this gas in the high pressure reservoir B.

If the suction exerted by the compressor were such as to be liable to create a dangerous degree of vacuum in the reservoir, and in particular to reduce the pressure below 0.8 kg. for example, the piston *i'* of the cut-in and cut-out device D' would be forced toward the end of the cylinder by the atmospheric pressure, and the circuit would be broken.

It is desirable that no introduction of air into the main reservoir shall take place when all the liquid from the tank car E has been withdrawn through the leg R of the siphon. For this purpose, there is arranged at the upper part of the latter, an apparatus adapted to close the suction or siphon pipe automatically at the end of the emptying operation. This apparatus is shown separately in section in Fig. 3 and comprises a cylinder H disposed between the siphon leg R and the pipe *f*. This cylinder contains a float I of thin metal, guided between lugs *v*; the position of the float I is indicated by a pointer *x*, the point of which is visible through a glass window *y*. On the upper extremity of the siphon leg R is arranged a valve J held on its seat by a spring J' bearing at its other end against the underside of the lugs v. A lever K, adapted to be operated by a small lever O fitted on the pivot of K outside the cylinder, acts on the valve J below the spring. At the upper part of the cylinder H the pipe f is closed by a valve N held on its seat by a spring N'. The valve N may be acted upon by a lever P having an operating handwheel Q mounted on its spindle.

When it is required to empty the tank car E into the reservoir A as before described, by first making a partial vacuum in the said reservoir, the operator operates at the same time the handwheel Q to compress the spring N' and open the valve N, and also the finger O to compress the spring J' and open the valve J. As soon as the liquid rises in the siphon leg R by reason of the priming of the siphon, the float I is raised by the liquid, as can be seen through the observation window y, the pointer x being then at the top of its travel. The lever O can be at once released, and the float I will remain upheld by the current of liquid, the spring J' which is very weak, being insufficient to hold the valve J upon its seat. But it is desirable not to release the handwheel Q during the entire emptying operation. When all the liquid from the reservoir E has been siphoned out, down to the bottom of the siphon leg R, air will enter the vessel H, and as the float I is no longer kept raised by liquid it will immediately fall by its own weight, as can be seen by observing the new position of the pointer x. The hand-wheel Q should then be released to enable the spring N' to close the valve N, while the lower valve J is closed by its own weight and under the action of the weak spring J'. In this way it is only possible for the very small quantity of air that may be in the apparatus H at the commencement of the operation, to enter the reservoir A. On the completion of an operation of filling the reservoir A as above explained, atmospheric pressure is reëstablished in the reservoir A by introducing gas from the high pressure reservoir B, and the pressure of the inert gas in the reservoir A will be kept exactly equal to the atmospheric pressure, as before explained.

Supposing now that it is required to draw off liquid from the reservoir A, compressed gas is admitted from reservoir B by way of pipe v, the cylinders D, D' of the cut-in and cut-out apparatus being put out of operation by breaking the electric circuit that supplies the motor. The draw-off pipe g, on which may be disposed a meter p, extends down to the bottom of the reservoir A and leads to a vessel F of any kind for receiving the liquid drawn off. The compressed gas supplied by the high pressure reservoir B for acting on the liquid in reservoir A, passes through a pressure reducing and indicating device. The drawing off of the liquid can be effected at a greater or less speed as desired by the operator, according to the pressure of the gas in the said pressure reducing device. After the required quantity of liquid has been drawn off, atmospheric pressure is again reëstablished in the main reservoir by switching on the electric current so as to permit of the operation of the motor under the control of the cut-in and cut-out device D, thus maintaining the pressure in A at the pressure of the atmosphere.

The reservoir A is provided with any suitable measuring or gage devices, and preferably with a float gage the chain h of which passes over a dial q suitably graduated and which will indicate at any moment the quantity of liquid contained in the reservoir. Fusible plugs capable of melting in case of an abnormal rise in temperature may be employed to obviate the occurrence of any over-pressure inside the reservoirs.

The inert neutral gas in the installation always remains the same; no losses can occur other than those that may result by leakage through the pump or in consequence of the gas becoming dissolved in the liquid. The loss of inert gas by dissolution in the liquid at the atmospheric pressure is compensated by the introduction of a corresponding quantity of this gas from the compressed gas reservoir B. The reservoir B is replenished through a pipe T from gas bottles G containing gas at very high pressure.

In the main reservoir A the inert gas becomes saturated with vapors of the liquid at the tension of said vapor at the ambient temperature. By compressing the saturated gas, the greater portion of this liquid is recovered and condenses in the reservoir B, from which it can be returned into the reservoir A by opening a valve e' fitted in a pipe e.

What we claim and desire to secure by Letters Patent is:—

1. In a storage system for liquids, the combination of a storage reservoir for liquid, a receiver for an inert gas, a return-pipe system between said liquid reservoir and gas receiver, whereby gas can be transferred to and from said gas receiver and said liquid reservoir without loss, a valve in said pipe-system controlling the flow of liquid from said gas receiver to said liquid reservoir, a gas-pump in said pipe-system adapted to pump gas from said liquid reservoir to said gas receiver, an electric motor for actuating said pump, a controller responsive to changes of pressure in said liquid reservoir, a switch operable by said controller, said switch being operated to close the circuit of said motor when the pressure in said liquid reservoir rises above atmospheric pressure, whereby said pump is operated to draw gas from said liquid reservoir into said gas receiver, and said switch being operated to open the circuit of said motor when the pressure in said liquid reservoir reaches atmospheric pressure, whereby a pressure approximately equal to atmospheric pressure is maintained in said liquid reservoir, a filling pipe, a second switch and a second controller operating said switch, said second switch being operated by said second controller to open the circuit of said motor when the pressure exceeds a predetermined rarefaction in said liquid reservoir, and means for cutting said first controller off from said liquid reservoir in circuit-closing position, whereby said pump may continue to work to produce a rarefaction in said liquid reservoir to an extent limited by the responsiveness of said second controller, whereby liquid may be drawn into said liquid receptacle through said filling pipe under a substantially constant force.

2. In a storage system for liquids, the combination of a storage reservoir for liquid, a receiver for an inert gas, a return-pipe system between said liquid reservoir and gas receiver, whereby gas can be transferred to and from said gas receiver and said liquid reservoir without loss, a valve in said pipe-system controlling the flow of liquid from said gas receiver to said liquid reservoir, a gas-pump in said pipe-system adapted to pump gas from said liquid reservoir to said gas receiver, an electric motor for actuating said pump, a controller responsive to changes of pressure in said liquid reservoir, a switch operable by said controller, said switch being operated to close the circuit of said motor when the pressure in said liquid reservoir rises above atmospheric pressure, whereby said pump is operated to draw gas from said liquid reservoir into said gas receiver, and said switch being operated to open the circuit of said motor when the pressure in said liquid reservoir reaches atmospheric pressure, whereby a pressure approximately equal to atmospheric pressure is maintained in said liquid reservoir, a filling pipe, a second switch and a second controller operating said switch, said second switch being operated by said second controller to open the circuit of said motor when the pressure exceeds a predetermined rarefaction in said liquid reservoir, and means for cutting said first controller off from said liquid reservoir in circuit-closing position, whereby said pump may continue to work to produce a rarefaction in said liquid reservoir to an extent limited by the responsiveness of said second controller, whereby liquid may be drawn into said liquid receptacle through said filling pipe under a substantially constant force, and means for obturating said filling pipe when air enters the same.

3. In a storage system for liquids, the combination of a storage reservoir for liquid, a receiver for an inert gas, a return-pipe system between said liquid reservoir and gas receiver, whereby gas can be transferred to and from said gas receiver and said liquid reservoir without loss, a valve in said pipe-system controlling the flow of liquid from said gas receiver to said liquid reservoir, a gas-pump in said pipe-system adapted to pump gas from said liquid reservoir to said gas receiver, an electric motor for actuating said pump, a controller responsive to changes of pressure in said liquid reservoir, a switch operable by said controller, said switch being operated to close the circuit of said motor when the pressure in said liquid reservoir rises above atmospheric pressure, whereby said pump is operated to draw gas from said liquid reservoir into said gas receiver, and said switch being operated to open the circuit of said motor when the pressure in said liquid reservoir reaches atmospheric pressure, whereby a pressure approximately equal to atmospheric pressure is maintained in said liquid reservoir, a filling pipe, a second switch and a second controller operating said switch, said second switch being operated by said second controller to open the circuit of said motor when the pressure exceeds a predetermined rarefaction in said liquid reservoir, and means for cutting said first controller off from said liquid reservoir in circuit-closing position, whereby said pump may continue to work to produce a rarefaction in said liquid reservoir to an extent limited by the responsiveness of said second controller, whereby liquid may be drawn into said liquid receptacle through said filling pipe under a substantially constant force, and means for obturating said filling pipe when air enters the same, said means comprising a valve and a float adapted to be lifted by the passage of liquid in said filling pipe to hold said valve in lifted position and to drop to allow said valve to close when there is no liquid to sustain it.

In witness whereof, we have hereunto signed our names in the presence of two subscribing witnesses.

JEAN FRANÇOIS ROLLAND.
PIERRE ANDRÉ PAUL MAUCLÈRE.

Witnesses:
  HANSON C. COXE,
  RENÉ BARLY.